(12) United States Patent
Charters et al.

(10) Patent No.: US 7,792,908 B2
(45) Date of Patent: Sep. 7, 2010

(54) METHOD AND SYSTEM FOR MESSAGE CONTENT DELIVERY

(75) Inventors: Graham Charters, Southampton (GB); Michael Friess, Böblingen (GB)

(73) Assignee: International Business Machines Corporation, Armonk, NY (US)

( * ) Notice: Subject to any disclaimer, the term of this patent is extended or adjusted under 35 U.S.C. 154(b) by 1625 days.

(21) Appl. No.: 11/044,582

(22) Filed: Jan. 27, 2005

(65) Prior Publication Data
US 2005/0188039 A1    Aug. 25, 2005

(30) Foreign Application Priority Data
Feb. 19, 2004  (GB) ................... 0403682.8

(51) Int. Cl.
*G06F 15/16* (2006.01)
(52) U.S. Cl. ...................................... 709/206
(58) Field of Classification Search ................ None
See application file for complete search history.

(56) References Cited

U.S. PATENT DOCUMENTS 6,334,151 B1 * 12/2001 Bolam et al. ............... 709/206

2002/0040374 A1   4/2002 Kent ........................ 707/516
2002/0138582 A1 * 9/2002 Chandra et al. ............. 709/206
2003/0120720 A1   6/2003 Montero .................... 709/203

FOREIGN PATENT DOCUMENTS

| EP | 1119135 A2 | 7/2001 |
|---|---|---|
| WO | WO03/043286 A2 | 7/2000 |

* cited by examiner

*Primary Examiner*—Larry Donaghue
(74) *Attorney, Agent, or Firm*—Yee & Associates, P.C.; David A. Mims, Jr.

(57) ABSTRACT

A method and system are provided for delivery of messages. A publishing application publishes a message via a communication infrastructure and one or more subscriber applications receive the message from the communication infrastructure. A message content schema is provided which enables the content parts of a message type to be identified. The communication infrastructure enables the one or more subscriber applications to register interest in selected content parts of the message type and the communication infrastructure obtains a message instance of the message type populated with data of a combined content subset as registered by the one or more subscriber applications. The communication infrastructure then delivers the message instance to a subscriber application including the selected content parts by the subscriber application.

19 Claims, 6 Drawing Sheets

METHOD AND SYSTEM FOR MESSAGE CONTENT DELIVERY

This invention relates to the field of distribution of information to multiple parties. In particular, the invention relates to publishing messages to subscribers or notifying events to registrants via a communication infrastructure.

In a publish/subscribe communication mechanism, a subscriber registers an interest in receiving messages from publishers via a communication infrastructure. Similarly, events are emitted from sources to registered parties (listeners) via a communication infrastructure. The messages or events may be wide ranging in form and are referred to generally herein as messages. The terms publish and subscribe are used throughout this document and are used in a broad sense to include the actions of emitting and registering. The registration of the interest is typically to a collection of potential message instances, for example, identified by reference to the message type, a message topic or event name. The publisher creates a message or event instance and publishes it to the communication infrastructure which then delivers it to the subscribers.

The publish/subscribe arrangement is suitable in situations where a single message is required by and distributed to multiple users. The publication operation is kept separate from the subscriptions and the publisher does not need to know anything about the type or number of subscribers. Subscribers can subscribe or unsubscribe at any time.

A communication infrastructure is the intermediary acting between the publishers and subscribers. A communication infrastructure can be formed of one or more message brokers and communication can be via a form of network including the Internet. The communication infrastructure matches publications to subscribers and handles the delivery of the messages.

A subscriber can choose to look at all messages published or only some of the messages based on criteria of interest to the subscriber. This is handled by content or topic based subscription.

In topic based subscription, messages are filtered by the header information provided for each message instance. However, there can be a large number of messages for every topic and many of the messages may not be of interest to a subscriber even when the topic matches the subscriber's request.

In content based subscription, messages are filtered by the communication infrastructure looking at the content of a message instance to see if it meets the subscriber's criteria.

In prior art systems, the entire message is delivered to the subscriber. In some instances, a subscriber is only interested in a subset of the data in a message. Also, in known systems, the publisher is always required to publish the entire message. It may be the case that there are some contents of the message which are not of interest to any of the subscribers and therefore, the publisher is creating and publishing data that no subscriber is interested in.

The effort to create and transport the message content depends on the content origin and size. In cases where the messages are typically large and the subscribers are only interested in a small subset, it is beneficial to optimise the content of the message. For example, in a business monitoring case, large business data structures are published and a subscriber may only be interested in a particular aspect of the business. However, they will receive the whole contents of the message in the form of the large business data structure.

It is an aim of the present invention to provide subscribers with a means not only to register their interest in messages but also to register an interest in specific content parts. It is a further aim of the present invention to enable publishers to provide only the content required by subscribers in order to minimise the amount of data they must construct during publication.

According to a first aspect of the present invention there is provided a method for delivery of messages comprising: addressing content parts of a message type; one or more subscribers registering with a communication infrastructure interest in selected content parts of a message type; a publisher having a message instance of a message type with data divided into the defined content parts; the communication infrastructure obtaining a message instance of a message type populated with the data of the combined selected content parts as registered by the one or more subscribers.

Preferably, the method includes the communication infrastructure delivering a message instance to a subscriber including the content data selected by the subscriber.

The step of addressing content parts of a message type may be by reference to parts in a content schema or an expression mechanism. The method may include sharing knowledge of the addressable content parts of a message type between a publisher, one or more subscribers and the communication infrastructure. For example, this shared knowledge may be by means of a standards body or, as another example, by a repository with message types and their message content parts.

There may be several alternative methods for the communication infrastructure to obtain a message instance populated with the data of the combined selected content parts. In a first embodiment this is by the publisher publishing the message instance with the required data of the content parts to the communication infrastructure. In a second embodiment, the communication infrastructure calls back to a publisher to obtain the required data of the content parts. In a third embodiment, this is by publishing to a publisher the list of the required content parts. In a fourth embodiment, this is by selecting the required data of the content parts from a message instance including all content published by a publisher. The fourth embodiment can be used with legacy publisher systems.

The communication infrastructure may be a messaging broker network and a publisher creates and publishes a message to a first broker with the data of the combined selected content parts of the subscribers' registered selected content parts in all down-stream brokers in the broker network.

The message may be an event notification and the communication infrastructure may be an event infrastructure in which listeners register an interest in events.

According to a second aspect of the present invention there is provided a system for delivery of messages comprising: a publishing application including means for publishing a message; one or more subscriber applications including means for receiving a message; a communication infrastructure for receiving the published message from the publishing application and sending the message to the one or more subscriber applications; means for addressing the content parts of a message type; the communication infrastructure including means for the one or more subscriber applications to register interest in selected content parts of a message type; and means for the communication infrastructure to obtain a message instance of a message type populated with the data of the combined selected content parts as registered by the one or more subscriber applications.

The system may preferably include the communication infrastructure having means for delivering a message instance to a subscriber application including the content data selected by the subscriber application.

The means for addressing the content parts of a message type may be by reference to parts in a content schema or an expression mechanism. The system may include means for sharing knowledge of the defined content parts of a message type between a publisher application, one or more subscriber applications and the communication infrastructure.

There may be several alternatives for the means for the communication infrastructure to obtain a message instance populated with the data of the combined selected content parts. In a first embodiment, this may include the publisher application publishing the message instance with the required data of the content parts to the communication infrastructure. In a second embodiment, the communication infrastructure may have means for calling back to a publisher application to obtain the required data of the content parts. In a third embodiment, the communication infrastructure may have means for publishing to a publisher application the list of the required content parts. In a fourth embodiment, the communication infrastructure may include means for selecting the required data of the content parts from a message instance including all content published by a publisher application.

The communication infrastructure may be a messaging broker network and a publisher application creates and publishes a message to a first broker with the data of the combined selected content parts of the subscribers' registered selected content parts in all down-stream brokers in the broker network.

The message may be an event notification and the communication infrastructure may be an event infrastructure in which listeners register an interest in events.

According to a third aspect of the present invention there is provided a computer program product stored on a computer readable storage medium comprising computer readable program code means for performing the steps of: addressing content parts of a message type; one or more subscribers registering with a communication infrastructure interest in selected content parts of a message type; a publisher having a message instance of a message type with data divided into the defined content parts; the communication infrastructure obtaining a message instance of a message type populated with the data of the combined selected content parts as registered by the one or more subscribers.

The communication infrastructure only distributes the subscribers' subset from a combined content subset obtained by the communication infrastructure. The result of this is to optimize the generation, transmission and consumption of the data.

The invention involves the aggregation of subscriptions to enable publishing the aggregation of message content of interest to subscribers. The invention is therefore suitable for use in tailored replication between brokers.

Embodiments of the present invention will now be described, by way of examples only, with reference to the accompanying drawings in which.

Figure 1:
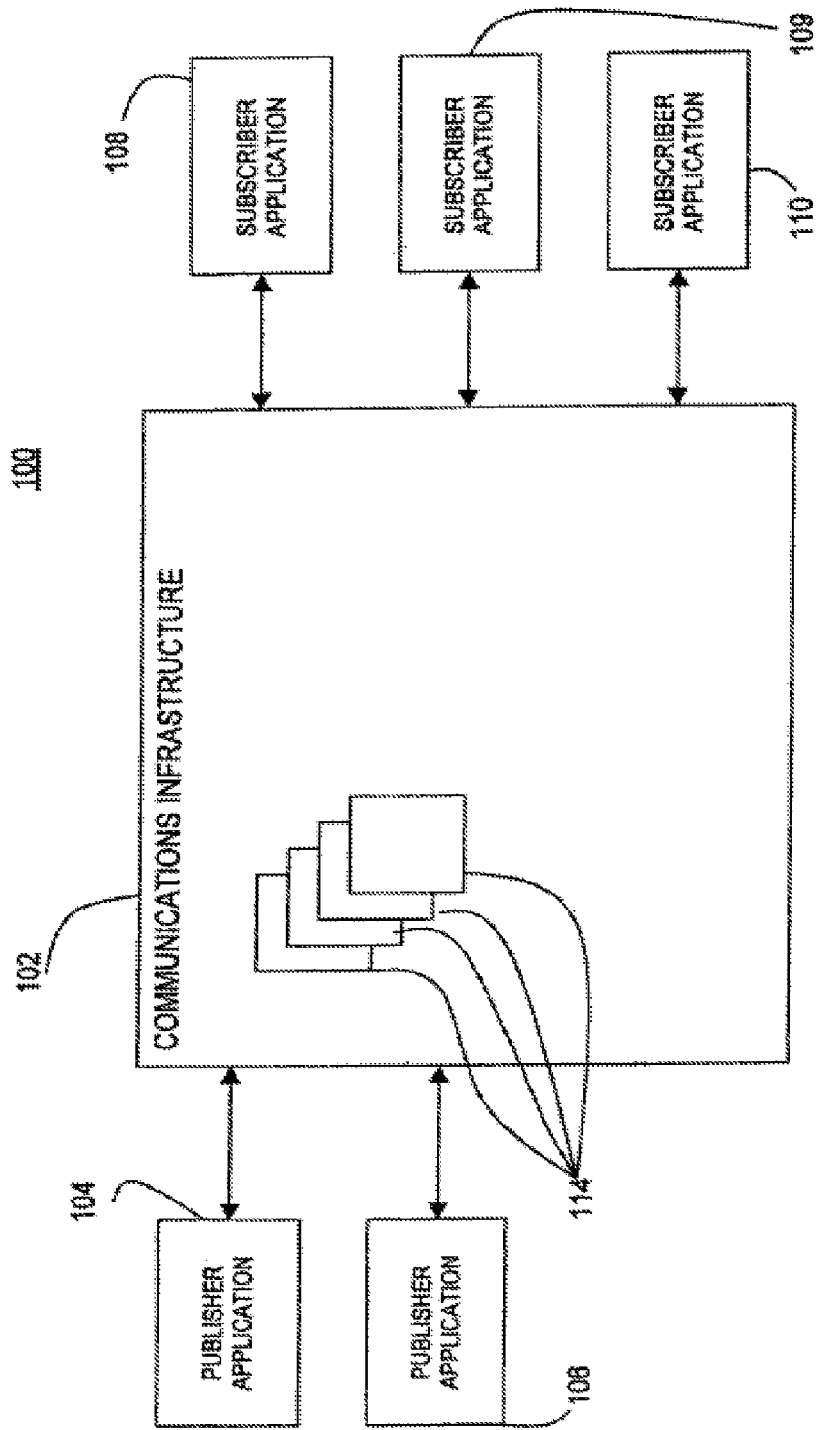
FIG. 1 is a block diagram of a publish/subscribe system as known in the prior art.

The present invention provides a method and system for message or event content delivery. Data is distributed as a unit such as a message or event via a communication infrastructure. In the described embodiments, a publish/subscribe system is described in which the messages are distributed. However, the described method and system also apply to the distribution of other units of data such as events via an event notification system. Referring to FIG. 1, a simplified arrangement of a known publish/subscribe system 100 is shown.

A communication infrastructure 102 is provided in a publish/subscribe system 100. Publisher applications 104, 106 can communicate with the communication infrastructure 102. Each publisher application 104, 106 can publish a message 114 by sending it to the communication infrastructure 102. In the example of FIG. 1, two publisher applications 104, 106 are shown.

Subscriber applications 108, 109, 110 are provided which also communicate with the communication infrastructure 102 to subscribe to messages 114. In the example of FIG. 1, three subscriber applications 108, 109, 110 are shown.

In the illustrated example, two publisher applications 104, 106 and three subscriber applications 108, 109, 110 are shown; however, it will be appreciated by a person skilled in the art that this is an example only and an infinite number of arrangements of applications is possible and only a very simple example is shown.

Applications can also be both publishers and subscribers. The publisher applications 104, 106 are not interested in where their published messages are going, and the subscriber applications 108, 109, 110 need not be concerned where the messages they receive have come from. The communication infrastructure 102 assures the validity of the message source, and manages the distribution of the messages according to the valid subscriptions registered in the communication infrastructure 102.

An example of a messaging infrastructure for delivery of messages is WebSphere MQ Integrator provided by International Business Machines Corporation (WebSphere is a trade mark of International Business Machines Corporation).

The communication infrastructure 102 in a publish/subscribe system 100 handles the processing, transformation and distribution of messages 114 passing between applications.

Topics provide a key to the delivery of messages 114 between a publisher application 104, 106 and subscriber applications 108, 109, 110. They provide an anonymous alternative to citing specific destination addresses. The communication infrastructure 102 attempts to match the topic in each published message 114 with a list of subscriber applications which have subscribed to that topic.

The communication infrastructure 102 has a controller for processing messages. The communication infrastructure 102 may be in the form of one or more message brokers. The communication infrastructure 102 has an input mechanism which may be an input queue or a synchronous input node by which messages are input when they are sent by a publisher application 104, 106. A matching engine compares the topic of the message with the registered subscriptions of the various subscriber applications 108, 109, 110 and from the result of that matching a recipient list is derived. An output mechanism transmits the processed messages to the subscriber applications that are specified in the recipient list.

In the case of the communication infrastructure 102 being in the form of more than one message broker, the message brokers communicate with each other as a broker network in which publish/subscribe applications are interacting with any one of a number of connected brokers. Subscriptions and published messages are propagated through the broker network. Brokers can propagate subscription registrations through the network of connected brokers, and publications can be forwarded to all brokers that have matching subscriptions.

Figure 2:
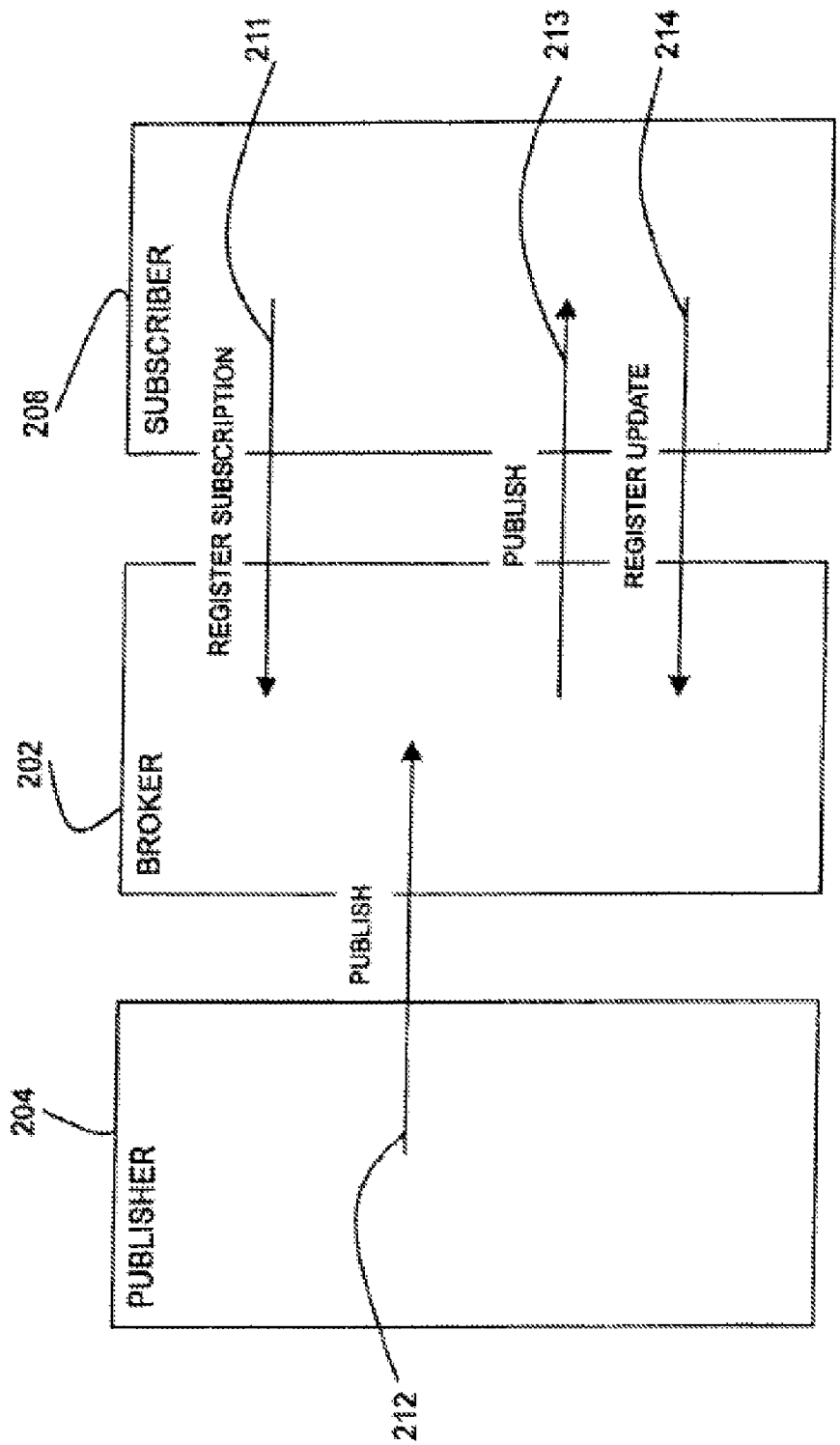
FIG. 2 is a schematic diagram showing the communication in a publish/subscribe system as known in the prior art.

FIG. 2 shows a simple form of communication between a publisher application 204, a broker 202 and a subscriber application 208 as known in existing publish/subscribe systems.

A subscriber application 208 registers a subscription 211 with the broker 202. A publisher application 204 publishes 212 a message on the broker 202. The broker 202 matches the published message with the subscription and publishes 213 the message to the subscriber application 208. The subscriber application 208 can de-register or request an update of his subscription 214 at any time.

In the method and system of the present invention, there is shared knowledge about the structure of message content and how to address the structural parts. This structure is referred to as the message content schema. The contents schema provides a means to identify structural parts of the whole message content. The publisher application, the communication infrastructure and the subscriber applications all know the structure of message content and how to address the structural parts.

The message content schema may be in the form of fields and sub-fields of content which divide the content of the message into parts. The message content schema may apply to one or more message types.

This shared knowledge can be provided, as an example, through a shared repository of message content schema. Alternatively, as another example, the shared knowledge may be by reference to a standards body which defines the content schema.

Alternatively, the shared knowledge may be sufficiently precise when it is known that messages adhere to a generalised structure and how to address parts of such a structure. For example, the messages could be well-formed XML documents and the subscribers register to content parts by means of an XPath expression that represents the interested content parts.

The contents schema can be provided as a flat structure of partitioned data or any other suitable structure.

For example, message schema for customer records of business X may take the following form:
Field 1: Customer details
   Sub-field 11: Customer name
   Sub-field 12: Customer identification number
Field 2: Contact details
   Sub-field 21: Primary contact's name
     Sub-field 211: Primary contact's telephone number
   Sub-field 22: Secondary contact's name
     Sub-field 221: Secondary contact's telephone number
Field 3: Address details
   Sub-field 31: Address line 1
   Sub-field 32: Address line 2
   Sub-field 33: Address line 3
   Sub-field 34: Zip code
   Sub-field 35: Country
Field 4: Account details
   Sub-field 41: VAT number In the above example, this may be a standard message schema for all message instances of a message type of "customers of business X". Any parties subscribing to message type "customers of business X" have shared knowledge with the publisher and the communication infrastructure of the fields in the content schema.

A subscriber can subscribe to Field 1 and Sub-field 35 in order to obtain publications of all customer names and identification numbers and the countries the customers are in.

In an extreme scenario, a subscriber may only want to know that a message instance has been sent with a particular field. For example, a subscriber may want to know when a message instance is sent which is an order from a customer in order to count how many orders are sent.

The communication infrastructure provides an interface so that a subscriber application can include the information of which content parts it is interested in when it registers its interest in certain message types. This can be specified in addition to known topic based or content based subscription.

The communication infrastructure provides a mechanism for the publisher application to populate only the combined content subset based on the union of the subscribers' content parts.

In this way, subscriber applications can register an interest in specific content within a message and publisher applications can limit their publications to the combined content subset of messages. This minimises the amount of data a publisher application must construct during publication and removes any unrequired content from publication. This also provides feedback to the publisher application of the content of messages which is of interest to subscriber applications.

The communication infrastructure distributes the subscriber application's subset from the combined content subset published by the publisher application. This removes any unnecessary distribution of unwanted content. However, in some circumstances it may be preferable to distribute the combined content subset to all subscribers.

Figure 3:
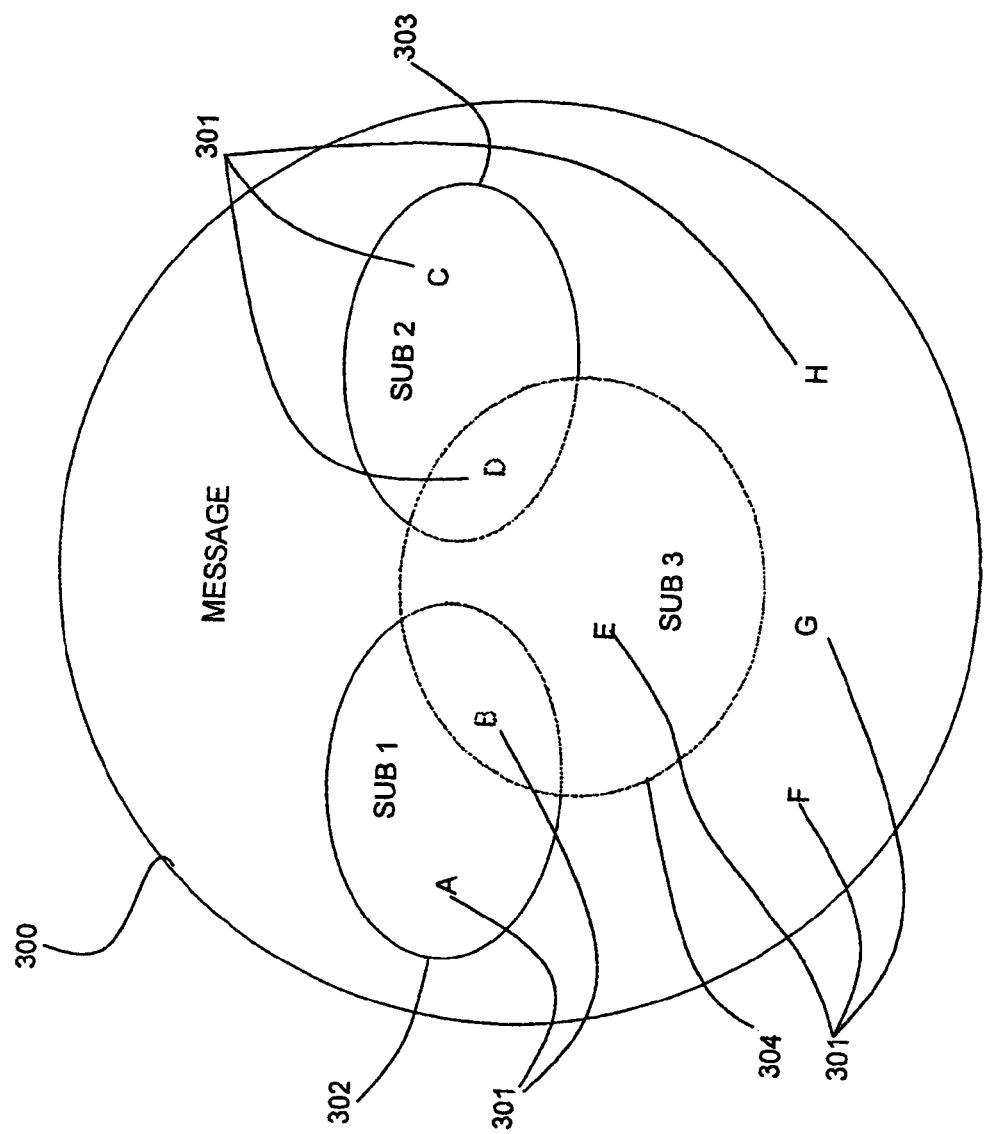
FIG. 3 is a schematic representation of the content of a message showing the combined data of subsets in accordance with the present invention.

FIG. 3 shows a schematic representation of a message 300 as a set. The message 300 has contents 301 represented by the letters A, B, C, D, E, F, G, H. Subsets 302, 303, 304 are defined within the message 300 representing subsets of the contents 301 which are of interest to three subscriber applications.

A first subscriber application "Sub 1" is interested in contents A, B. A second subscriber application "Sub 2" is interested in contents C, D. A third subscriber application "Sub 3" is interested in contents B, D, E. None of the three subscriber applications is interested in contents F, G, H.

The combined content subset is the area within the three subsets 302, 303, 304 shown in FIG. 3. In other words, in this example the combined content subset is A, B, C, D, E.

The mechanism by which the publisher application populates the combined content subset can be explicit or implicit. In a first embodiment in which the mechanism is explicit, the publisher application requests the combined content subset from the communication infrastructure. In the second embodiment in which the mechanism is implicit, the publisher application passes a minimally populated message instance to the communication infrastructure and the communication infrastructure calls back to the publisher application to populate the required fields. This second embodiment is referred to as lazy population.

Figure 4A:
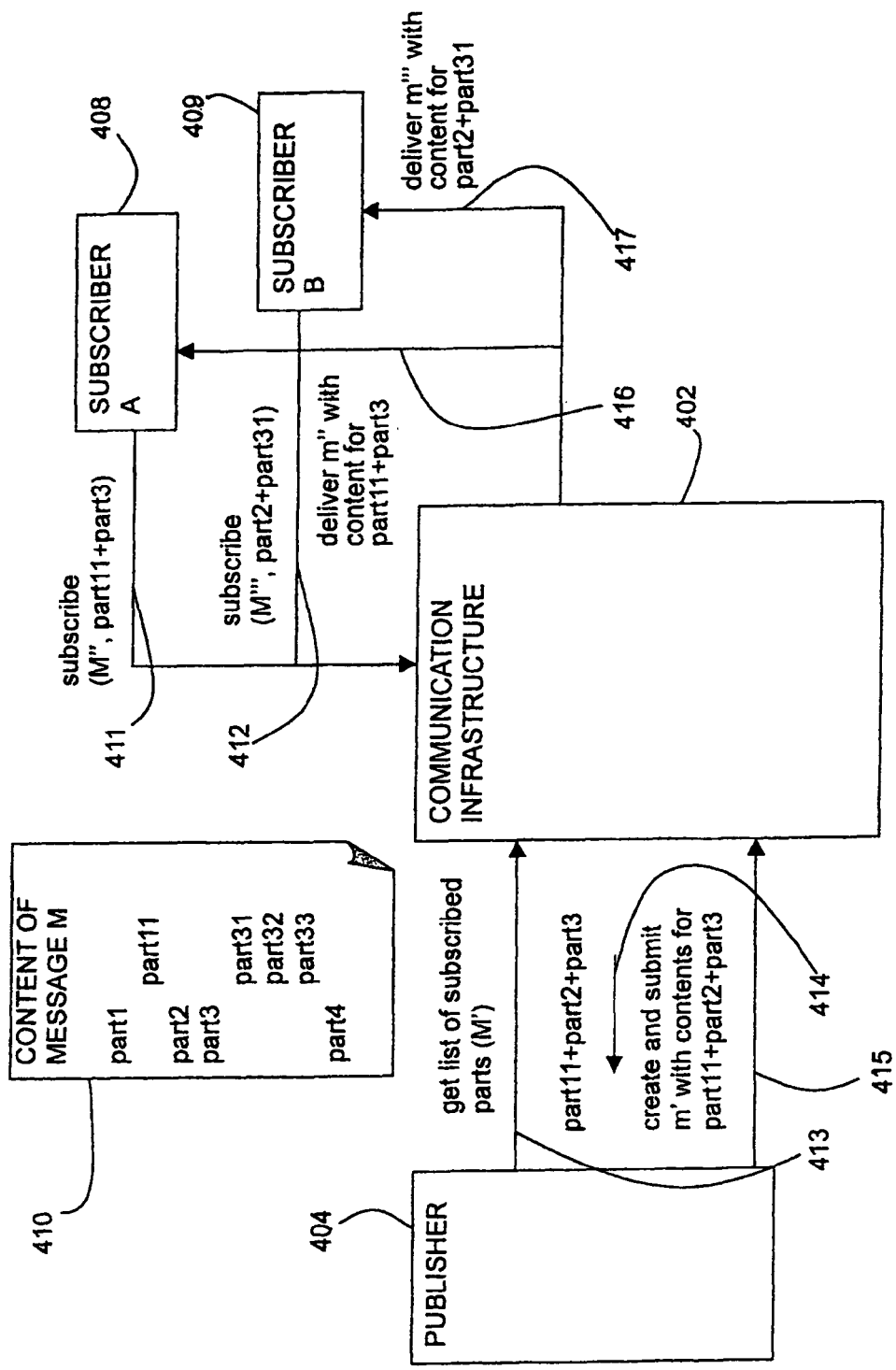
FIGS. 4A and 4B are block diagrams of first and second embodiments of publish/subscribe systems in accordance with the present invention.
Figure 4B:
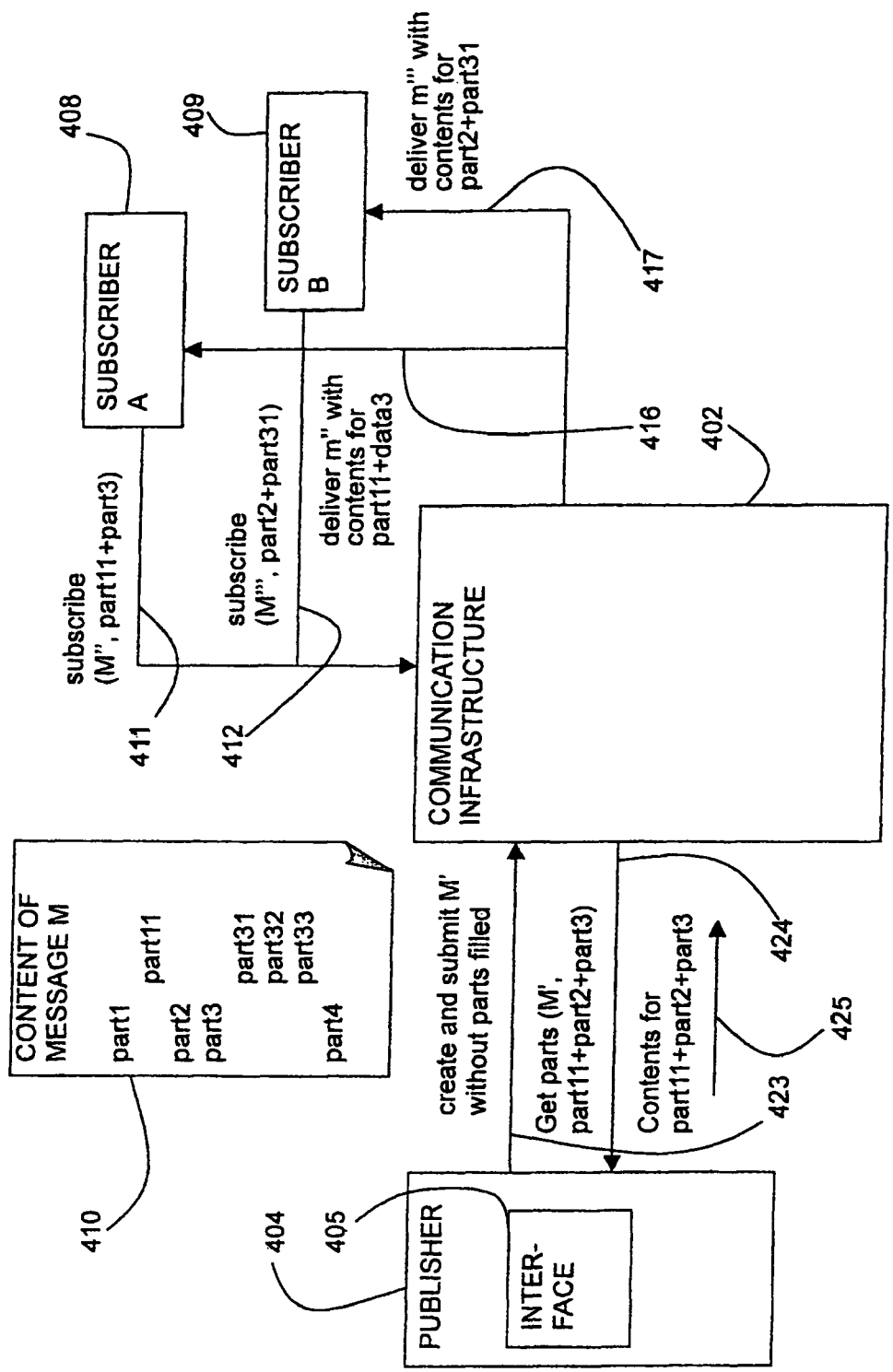

The first and second embodiments are shown in FIGS. 4A and 4B. In both FIGS. 4A and 4B, a communication infrastructure 402 is shown providing communication between a publisher application 404 and two subscriber applications 408, 409. The publisher application 404 has a shared understanding of the content schema of a message. This message content schema 410 may, for example, be provided in a message repository to which the publisher application 404, the subscriber applications 408, 409 and the communication infrastructure 402 all have access.

In the example shown in FIGS. 4A and 4B, the message content schema M 410 has the following parts:

```
part 1
    part 11
    part 12
part 2
part 3
    part 31
    part 32
    part 33
part 4
```

A first subscriber application 408 referred to as subscriber A subscribes 411 to message M", part 11 and part 3. A second subscriber application 409 referred to as subscriber B subscribes 412 to message M'", part 2 and part 31. In FIGS. 4A and 4B, a capitalised "M" is used to refer to message content schema and a lower case "m" is used to refer to a message instance.

The communication infrastructure 402 provides an interface to determine the combined content parts that subscriber applications 408, 409 are actually interested in. The combined content is the union of the content parts that each subscriber requested.

In this example, subscriber A 408 subscribes to part 11 and part 3 and subscriber B 409 subscribes to part 2 and part 31. Therefore, the combined content is parts 11, 2, and 3. However, the communication infrastructure 402 may form a superset of the combined content by including other parts if this makes the administration easier. In this example, the superset may be formed of parts 1, 2 and 3 in order to include the same level of hierarchy of parts.

The publisher application 404 retrieves the information about the required content parts from the communication infrastructure 402. This is shown in FIG. 4A as "getting the list of subscribed parts (M')" 413.

The communication infrastructure 402 responds with the answer, in this case "part 11+part 2+part 3" 414, to the publisher application 404. The publisher application 404 then creates and fills only the relevant parts of the message and submits the message m' to the communication infrastructure 402. This is shown as "create and submit m' with contents for part 11+part 2+part 3" 415.

The communication infrastructure 402 then publishes the required parts to the subscriber applications 408, 409 in accordance with their requirements. In this example, message m" is delivered 416 to subscriber A with part 11 and part 3 and message m'" is delivered 417 to subscriber B with part 2 and part 31.

In the second embodiment shown in FIG. 4B, the "lazy population" part of the communication infrastructure 402 preferably resides local to the publisher application 404. The publisher application 404 provides an interface 405 to the communication infrastructure 402 to facilitate the population of the message content.

The publisher application 404 notifies the communication infrastructure 402 to create a message or, alternatively, it creates and submits 423 a minimal message to the communication infrastructure 402. The communication infrastructure 402 determines whether and what content of the message needs to be provided based on the registered subscriber applications 408, 409. The request for this is shown in FIG. 4B as "get parts (M', part 11+part 2+part 3) 424. The communication infrastructure 402 populates 425 the relevant content parts of the message using the call back interface 405 provided by the publisher application 404.

In both embodiments described above and shown in FIGS. 4A and 4B, the communication infrastructure 402 will deliver the message to the subscriber applications 408, 409. The communication infrastructure 402 might optimise the delivery by delivering a set of content parts which is a superset of the content parts the subscriber application requested. For example, in the example shown in FIGS. 4A and 4B, the communication infrastructure may deliver "part 11+part 2+part 3" or even "part 1+part 2+part 3" to both subscriber A and subscriber B so that the communication infrastructure 204 reduces the number of different configurations of parts to be delivered.

In a third embodiment, a publisher application may subscribe to the communication infrastructure to obtain the list of required parts in the combined content. The list of subscribed parts can be constructed by the communication infrastructure each time a subscriber registers, changes its registration or de-registers. An amended list of subscribed parts can be published by the communication infrastructure when a new list differs from a previous list. This requires a system for knowing what information has already been published in a "retain publication" style in the communication infrastructure for when a new publisher application comes on line and new information is available.

In a fourth embodiment, a publisher application publishes a message to the communication infrastructure as in the prior art. The communication infrastructure handles the compilation of the combined content subset from the published message and distributes the content subsets to the subscribers. In this embodiment, the publisher application must still publish the entire message. However, it enables the method and system to be used with legacy publisher applications.

Figure 5:
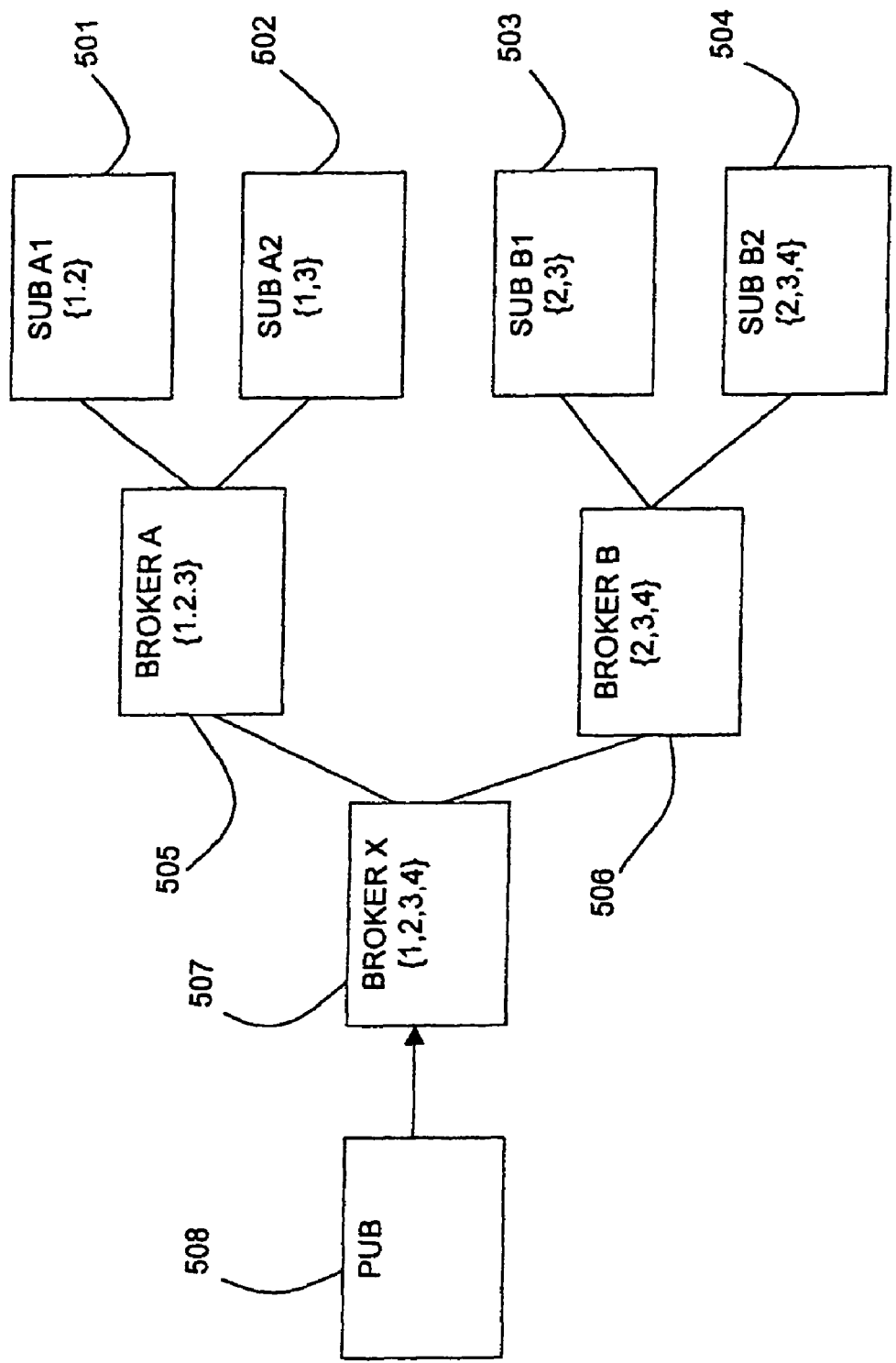
FIG. 5 is a block diagram of a publish/subscribe system with a network of brokers in accordance with the present invention.

The described method and system extend to subscription propagation in a network of brokers. Referring to FIG. 5, subscriber applications 501, 502 referred to as subscribers A1 and A2 subscribe on broker A 505 and subscriber applications 503, 504 referred to as subscribers B1 and B2 subscribe on broker B 506. Brokers A and B communicate with broker X 507. A publication application 508 publishes on broker X 507.

Subscriber A1 subscribes on parts {1,2}, subscriber A2 subscribes on parts {1,3}, so broker A subscribes on parts {1,2,3}.

Subscriber B1 subscribes on parts {2,3}, subscriber B2 subscribes on parts {2,3,4}, so broker B subscribes on parts {2,3,4}.

Broker X informs the publisher to publish parts {1,2,3,4}.

Broker X forwards the data of parts {1,2,3} to broker A.

Broker X forwards the data of parts {2,3,4} to broker B.

In this way, there is optimisation in the content of messages being communicated between brokers in a network. The aggregation of the message content is applied at each level of the network.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

What is claimed is:

1. A method for delivery of messages comprising:

identifying content parts of a message type;

receiving by a communication infrastructure of a computer a registration for a subscription from a plurality of subscribers each registering an interest in selected content parts within the identified content parts of the message type, wherein the communication infrastructure of the computer is an intermediary between the plurality of subscribers and a publisher;

determining by the communication infrastructure of the computer a combined content subset based on a union of the selected content parts selected by each of the plurality of subscribers within the identified content parts;

retrieving by the publisher information about the combined content subset of the selected content parts selected by each of the plurality of subscribers from the communication infrastructure of the computer;

publishing by the publisher a message instance of the message type created by the publisher using data of the combined content subset based on the retrieved information about the combined content subset;

receiving by the communication infrastructure of the computer the published message instance of the message type created using the data of the combined content subset from the publisher; and transmitting by the communication infrastructure of the computer only specific content within the published message instance to each subscriber within the plurality of subscribers based on requirements of the subscription received from each subscriber.

2. The method of claim 1, wherein the method includes the communication infrastructure delivering the published message instance to a subscriber including specific content data selected by the subscriber.

3. The method of claim 1, wherein the step of identifying content parts of a message type is by reference to parts in a content schema or an expression mechanism.

4. The method of claim 1, wherein the communication infrastructure receives the published message instance created using the data of the combined content subset by the publisher publishing the message instance with required data of the content parts to the communication infrastructure.

5. The method of claim 1, wherein the communication infrastructure receives the published message instance created using the data of the combined content subset by the communication infrastructure calling back to the publisher to obtain required data of the content parts.

6. The method of claim 1, wherein the communication infrastructure receives the published message instance created using the data of the combined content subset by publishing to the publisher a list of required content parts.

7. The method of claim 1, wherein the communication infrastructure receives the published message instance created using the data of the combined content subset by selecting required content parts from a message instance including all content published by the publisher.

8. The method of claim 1, wherein the communication infrastructure is a messaging broker network and the publisher creates and publishes a message to a first broker with the combined content subset of the selected content parts of subscribers' registered selected content parts in all downstream brokers in the messaging broker network.

9. The method of claim 1, wherein the message type is a notifying event.

10. A system for delivery of messages comprising:

a publishing application including means for publishing a message;

a plurality of subscriber applications including means for receiving a published message;

a communication infrastructure for receiving the published message from the publishing application and sending the published message to the one or more subscriber applications;

means for identifying content parts of a message type;

means for receiving by the communication infrastructure a registration for a subscription from the plurality of subscriber applications each registering an interest in selected content parts within the identified content parts of the message type, wherein the communication infrastructure is an intermediary between the plurality of subscribers and a publisher;

means for determining by the communication infrastructure a combined content subset based on a union of the selected content parts selected by each of the plurality of subscribers within the identified content parts;

means for retrieving by the publisher information about the combined content subset of the selected content parts selected by each of the plurality of subscribers from the communication infrastructure;

means for publishing by the publisher a message instance of the message type created by the publisher using data of the combined content subset based on the retrieved information about the combined content subset;

means for receiving by the communication infrastructure the published message instance of the message type created using the data of the combined content subset from the publisher application; and means for transmitting by the communication infrastructure only specific content within the published message instance to each subscriber within the plurality of subscribers based on requirements of the subscription received from each subscriber.

11. The system of claim 10, wherein the system includes the communication infrastructure having means for delivering the published message instance to a subscriber application including specific content data selected by the subscriber application.

12. The system of claim 10, wherein the means for identifying the content parts of a message type is by reference to parts in a content schema or an expression mechanism.

13. The system of claim 10, wherein the means for the communication infrastructure to receive the published message instance created using the data of the combined content subset includes the publisher application publishing the message instance with required data of content parts to the communication infrastructure.

14. The system of claim 10, wherein the means for the communication infrastructure to receive the published message instance created using the data of the combined content subset includes the communication infrastructure having means for calling back to the publisher application to obtain required data of the content parts.

15. The system of claim 10, wherein the means for the communication infrastructure to receive the published message instance created using the data of the combined content subset includes means for publishing to the publisher application a list of required content parts.

16. The system of claim 10, wherein the means for the communication infrastructure to receive the published message instance created using the data of the combined content subset includes means for selecting required content parts from a message instance including all content published by the publisher application.

17. The system of claim 10, wherein the communication infrastructure is a messaging broker network and the publisher application creates and publishes a message to a first broker with the combined content subset of subscribers' registered selected content parts in all down-stream brokers in the messaging broker network.

18. The system of claim 10, wherein the message type is a notifying event.

19. A computer program product stored on a non-transitory computer readable storage medium comprising computer readable program code means for performing the steps of:

identifying content parts of a message type;

receiving by a communication infrastructure a registration for a subscription from a plurality of subscribers each registering an interest in selected content parts within the identified content parts of the message type, wherein the communication infrastructure is an intermediary between the plurality of subscribers and a publisher;

determining by the communication infrastructure a combined content subset based on a union of the selected content parts selected by each of the plurality of subscribers within the identified content parts;

retrieving by the publisher information about the combined content subset of the selected content parts selected by each of the plurality of subscribers from the communication infrastructure;

publishing by the publisher a message instance of the message type created by the publisher using data of the combined content subset based on the retrieved information about the combined content subset;

receiving by the communication infrastructure the published message instance of the message type created using the data of the combined content subset from the publisher; and transmitting by the communication infrastructure only specific content within the published message instance to each subscriber within the plurality of subscribers based on requirements of the subscription received from each subscriber.

\* \* \* \* \*